United States Patent
Parkinson

(10) Patent No.: US 9,531,544 B2
(45) Date of Patent: Dec. 27, 2016

(54) TWO-DIMENSIONAL BAR CODE FOR ID CARD

(75) Inventor: Steven W. Parkinson, San Jose, CA (US)

(73) Assignee: Red Hat, Inc., Raleigh, NC (US)

( * ) Notice: Subject to any disclaimer, the term of this patent is extended or adjusted under 35 U.S.C. 154(b) by 436 days.

(21) Appl. No.: 11/809,007

(22) Filed: May 31, 2007

(65) Prior Publication Data

US 2008/0301464 A1    Dec. 4, 2008

(51) Int. Cl.
    *H04L 9/32* (2006.01)
(52) U.S. Cl.
    CPC .................................. *H04L 9/3247* (2013.01)
(58) Field of Classification Search
    USPC ........................................................ 235/380
    See application file for complete search history.

(56) References Cited

U.S. PATENT DOCUMENTS

| | | | | |
|---|---|---|---|---|
| 5,449,891 A * | 9/1995 | Giebel | ............... | G06K 7/10861 235/462.31 |
| 5,469,506 A * | 11/1995 | Berson | ............... | G06K 9/00 235/379 |
| 5,671,374 A * | 9/1997 | Postman | ............... | G06F 1/1626 235/472.01 |
| 5,869,822 A * | 2/1999 | Meadows, II | ..... | G07C 9/00087 235/380 |
| 6,328,209 B1 * | 12/2001 | O'Boyle | ............... | G06K 19/14 235/380 |
| 7,165,718 B2 * | 1/2007 | Blancas | ............... | G06Q 20/02 235/375 |
| 2001/0051996 A1 * | 12/2001 | Cooper | ............... | G06Q 10/10 709/217 |
| 2002/0122568 A1 * | 9/2002 | Zhao | ............... | G06F 21/10 382/100 |
| 2005/0163352 A1 * | 7/2005 | Itoh | ............... | G06K 9/00026 382/124 |
| 2005/0229010 A1 * | 10/2005 | Monk | ............... | G07D 7/20 713/186 |
| 2007/0043668 A1 * | 2/2007 | Baxter | ............... | G06Q 20/0855 705/50 |
| 2007/0091376 A1 * | 4/2007 | Calhoon | ............... | G06T 1/0021 358/3.28 |
| 2007/0183623 A1 * | 8/2007 | McKinley | ............... | G06F 21/125 382/100 |
| 2008/0149713 A1 * | 6/2008 | Brundage | ............... | G06T 1/0071 235/435 |

* cited by examiner

*Primary Examiner* — Michael G Lee
*Assistant Examiner* — David Tardif
(74) *Attorney, Agent, or Firm* — Lowenstein Sandler LLP

(57) ABSTRACT

A method and apparatus for an identity card having improved security features. The identity card can have a two-dimensional bar code or similar encoding of data allowing for verification of the authenticity of the identity card. The two-dimensional bar code can store security data such as codes or image data that can be decoded and cross-checked against the visible user data to ensure that the card has not been improperly modified.

8 Claims, 6 Drawing Sheets

TWO-DIMENSIONAL BAR CODE FOR ID CARD

TECHNICAL FIELD

Embodiments of the invention related to the use of a identify card for managing security. Specifically, embodiments of the invention relate to the use of a two dimensional bar code with other features of the identity card to improve security.

BACKGROUND

Identity cards are commonly used to control access to computers, locations, privileges and similar resources. The identity card provides security for the control of these resources by matching picture identification with a name, number or similar information. For example, a driver's license includes a name, picture, address and license number. The picture is used to match a holder to the card and the name and number are used to look up a status of the license (e.g., suspended) or similar information. This provides a service to the holder by linking the user with the information on the card to prove the identity of the user. The identity card provides a service to the state by allowing it to correctly identify an individual for purposes of assigning privileges, resources, charges or similar actions that rely on accurate identification of a recipient. However, the accuracy and security of the license can be circumvented by modification of the license. For example, the license can be modified by replacing the photo to allow another person to utilize the license and link themselves to the information of another person.

Similarly, an identity card such as a driver's license can be counterfeited such that on inspection it appears to be a legitimate license. The features of a driver's license are discernable by visual inspection. The format of a portrait, license number, logo, watermark or similar feature can be easily inspected and replicated. A counterfeiter can produce driver's licenses that are visually identical to an actual driver's license. This allows individuals with counterfeited licenses to improperly gain access to the privileges associated with the license without meeting a state's requirements for obtaining a driver's license.

Other identity cards issued by employers, the government or other entities can similarly be modified or counterfeited. This allows the holders of these modified and counterfeited cards to obtain benefits and gain access to resources illegally.

BRIEF DESCRIPTION OF THE DRAWINGS

The present invention is illustrated by way of example, and not by way of limitation, in the figures of the accompanying drawings and in which.

DETAILED DESCRIPTION

Figure 1:
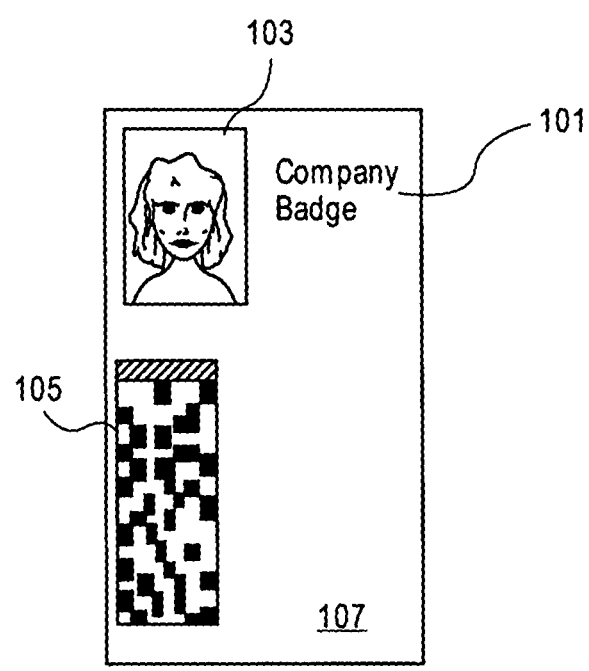
FIG. 1 is a diagram of one embodiment of an identity card.

Described herein is a method and apparatus for an identity card with improved security features. The identity card can have a two-dimensional bar code or similar encoding of data allowing for verification of the authenticity of the identity card. The two-dimensional bar code can store security data such as codes or image data that can be decoded and cross-checked against the visible user data to ensure that the card has not been improperly modified.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "encoding," "reading," "comparing," "embedding," "processing," "computing," "calculating," "determining," "approving," "signing," "displaying" or the like, refer to the actions and processes of a computer system, or similar electronic computing device that manipulates and transforms data represented as physical (electronic) quantities within the computer system's registers and memories into other data similarly represented as physical quantities within the computer system memories, registers or other such information storage, transmission or display devices.

The present invention also relates to an apparatus for performing the operations herein. This apparatus can be specially constructed for the required purposes or it can comprise a general purpose computer selectively activated or reconfigured by a computer program stored in the computer. Such a computer program may be stored in a computer readable storage medium, such as, but not limited to, any type of disk including floppy disks, optical disks, CD-ROMs and magnetic-optical disks, read-only memories (ROMs), random access memories (RAMs), EPROMs, EEPROMs, magnetic or optical cards or any type of media suitable for storing electronic instructions, each of which may be coupled to a computer system bus.

The algorithms and displays presented herein are not inherently related to any particular computer or other apparatus. Various general purpose systems may be used with programs in accordance with the teachings herein or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A machine-accessible storage medium includes any mechanism for storing or transmitting information in a form readable by a machine (e.g., a computer). For example, a machine-accessible storage medium includes read only memory ("ROM"), random access memory ("RAM"), magnetic disk storage media; optical storage media, flash memory devices or other type of machine-accessible storage media.

FIG. 1 is a diagram of one embodiment of an identity card. In one embodiment, an identity card 107 includes public information 101, 103 and private information 105. The public information 101, 103 is that information provided by the identity card 107 that is easily accessible and understood when viewed by an individual. For example, an identification card 107 has a picture 103 of the card holder and printing 101 indicating the identity card 107 is a company badge. Other public information may include any type or amount of information including a name, identification number, license number, company or organization information or similar information.

Private information 105 can be encoded on the identity card. For example, private information 105 can be encoded as a two dimensional bar code or similar printed encoding method. A two-dimensional bar code can encode a larger amount of data than a single dimensional bar code. A two-dimensional bard code can encode from 2 to 10 kilobytes of data within a two square inch space. In another embodiment, a three dimensional encoding, a stenographic encoding or similar printed encoding is utilize to store data on the card. Use of a printed encoding minimizes cost compared to magnetic strips or smart card chips. The encoded data can be stored in any format or using any cryptographic algorithm. Encrypting the data provides an additional level of security to prevent an unauthorized reading of the encoded data. The encoded private data can provide verification against modification or counterfeiting of the identity card. The private data can include matching data for the public data including an image, name, company information and similar information. This private data can be accessed by authorized individuals to verify the public information and approve security requests of an identity card holder. The private data enhances the security provided by the identity card because the data is not apparent to a viewer and imitation of the data will not result in data corresponding to modified public information and a counterfeited card will not have encoded data matching the public data.

Figure 2:
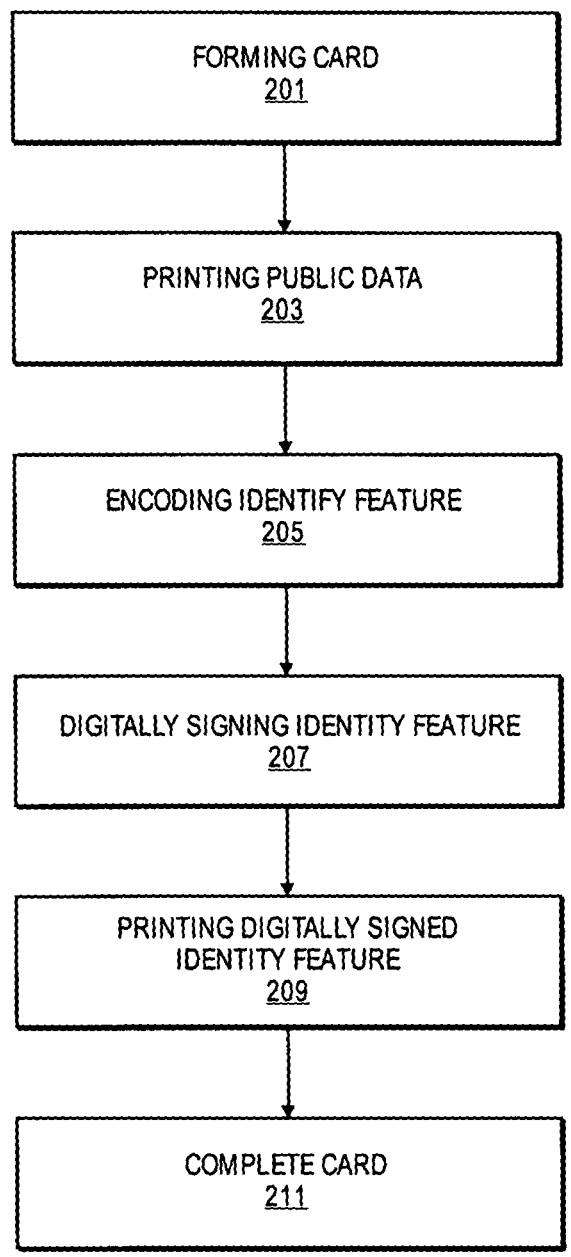
FIG. 2 is a flowchart of one embodiment of a process for creating an identity card.

FIG. 2 is a flowchart of one embodiment of a process for creating an identity card. In one embodiment, the process is initiated by forming a substrate or base of a card (block 201). The card can be formed from any material, including plastics, resins, organic materials, metals and similar materials. The card can be formed to have any shape and dimensions. The public information is then printed onto the surface of the card (block 203). Any process for printing can be used including laser printing, bubble jet printing and similar printing techniques. Any amount of public data can be printed onto the identity card. Public data can be printed on any surface of the card or on multiple surfaces of the card.

In one embodiment, the public data, a subset of the public data or related data is encoded as private data and as an identity feature (block 205). An identity feature is a set of data that identifies a holder of a card. An identity feature can include an image of the user, name of the user, voice of the user, fingerprint of the user, signature or similar identifying feature that can be compared to public information on the identity card or obtained separate from the card. For example, a signature of a card holder can be stored in the private data as an identity feature. This signature data can be compared to a signature provided by the identity card holder to verify the identity of the card holder. In another example, the identity feature is an image of the card holder. The image can be retrieved from the card and compared to the publicly printed image or to the holder to verify the identity of the card holder. Any type of encoding can be used as appropriate to the type of data to be encoded. For example, image data can be encoded as a bitmap, graphics interchange format (GIF), joint picture experts group (JPEG) format or similar image format and translated into a binary stream representing the values of the encoded data. Identity information can also take the form of data describing biometric features of the identity card holder in a condensed or processed manner. For example, it is common to process the image of the card holder's fingerprint into a set of "fingerprint minutiae," which describe the relative position and quantity of hoops, loops, and bifurcations of fingerprint ridges. The encoded data can further be encrypted or a similar additional layer of security can be attached to the encoded data. In one embodiment, the encoded data can be digitally signed (block 207). In a typical digital signature process, the encoded data is first hashed using a hash algorithm such as MD5, SHA-1, SHA-256 or other hash algorithm. The hash is then encrypted using the card issuer's private key if using an asymmetric key with the RSA, DSA or ECC or other asymmetric cryptographic algorithms. The hash can also be encrypted with a the card issuer's secret key if using a symmetric key with the DES, Triple-DES, RC4, AES or other symmetric cryptographic algorithm. The resulting data forms the digital signature. The digital signature can be verified by first hashing the signed data, then comparing the hash of the signed data with the hash data in the digital signature, which is obtained by decrypting the data with the card issuer's public key, if using the asymmetric key algorithm or with the card issuer's secret key if using the symmetric key algorithm.

In one embodiment, the digitally signed identity feature is then printed onto the identity card (block 209). The data can be printed as a two-dimensional bar code, holographic or three-dimensional image or similar format with sufficient storage capacity to store the private data. The data can also be steganographically embedded within public data such as an image or similar printed material.

In one embodiment, public and private data associated with a card or additional data associated with the card are stored in a database in communication with the manufacturing equipment. The database is managed by a server and stores the public and private data to be printed on an identity card. The server processes the data to encode the data and carries out the digital signature process. This data is provided by the server to the manufacturing equipment to allow it to be printed on the identity card. The completion of the process of manufacturing the card can be recorded in the database (block 211). In another embodiment, the card is activated at a later date and the activation is stored in the database.

Figure 3:
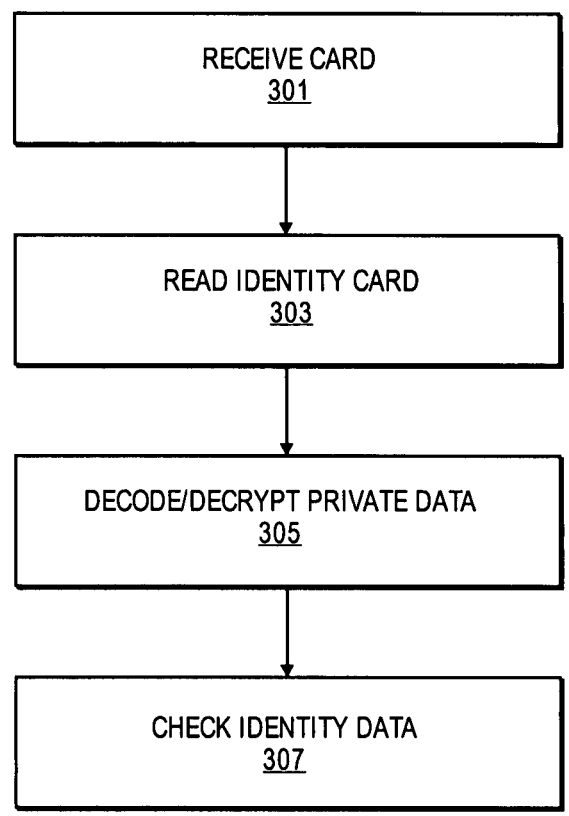
FIG. 3 is a flowchart of one embodiment of a process for verifying an identity card.

FIG. 3 is a flowchart of one embodiment of a process for verifying an identity card. In one embodiment, the verification process is initiated in response to a card being read or input into a verification apparatus (block 301). The verification apparatus can be a dedicated verification apparatus or a general purpose apparatus that executes a verification program. The verification apparatus includes a reading device that allows the verification apparatus to read in the private information of the card (block 303). The verification apparatus may also read in public information from the card. The reading device may be an optical scanning device, specialized bar code reading device or similar reading device.

The private data is decoded (block 305). The verification apparatus can detect the type of encoding and decode the private data using the appropriate decoding algorithm. The encoding type can be a fixed encoding type; the encoding type can be indicated on the card or in the private data or similarly determined. In one embodiment, the encoded data can further be encrypted. The verification apparatus determines the type of encryption by use of a fixed encryption type, detecting an indicator of encryption type in the private data or similarly determines the type of encryption. The appropriate decryption algorithm is then applied to decrypt the private data. The private data can also be decrypted prior to being decoded or further decoded after decryption.

The decoded and/or decrypted private data is then checked for authenticity (block 307). The authenticity check can be performed by comparison, automated or manual, using comparison techniques appropriate for the type of data. For example, if the private data is an image, then a comparison of the image with a public image is made using an image comparison program. The private data can be compared against public data from the card, real-time or recently obtained identity information, such as a capture of a signature, image of an individual, voice recording or similar immediate comparison, database or similar archive data associated with the decoded data (e.g., the decoded data includes an address or resource locator for associated database information) or similar data.

Figure 4:
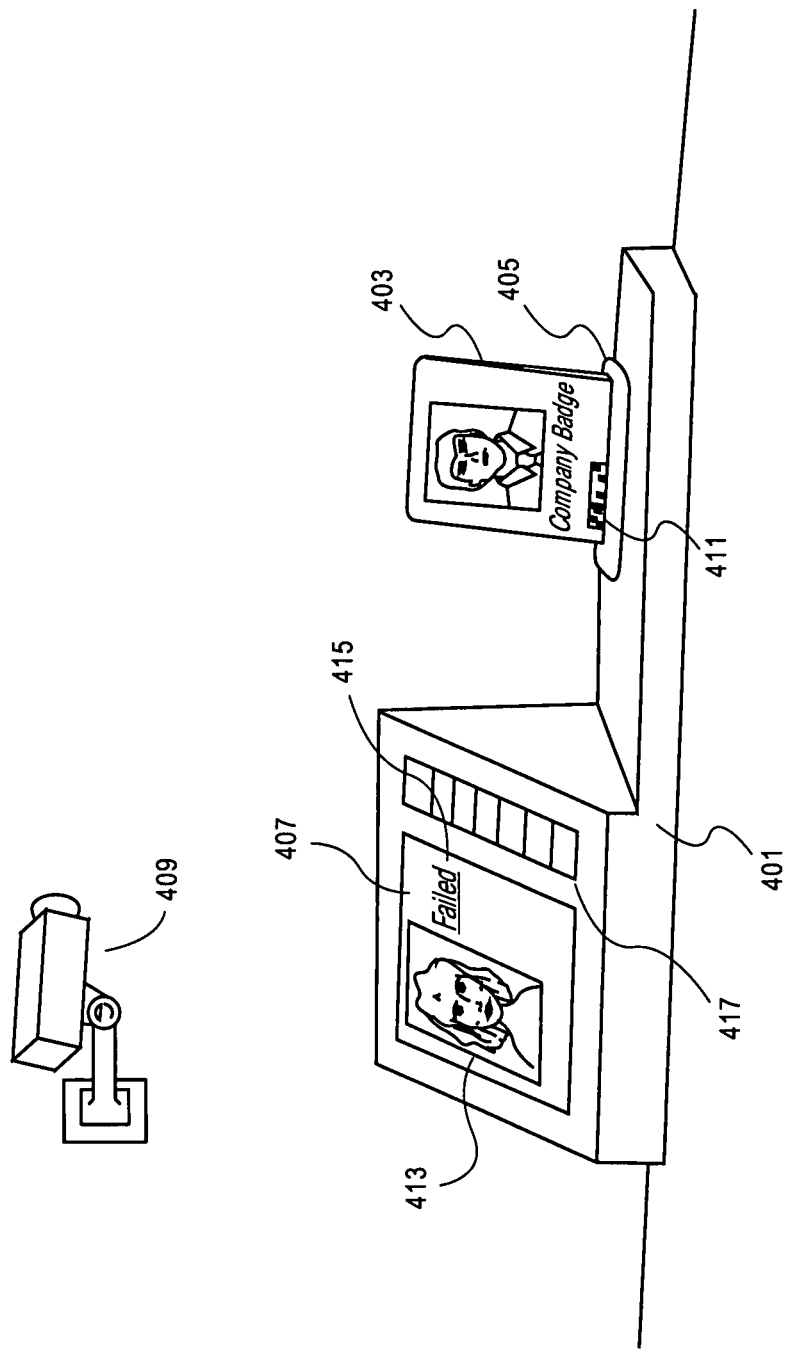
FIG. 4 is a diagram of one embodiment of an apparatus for verifying an identity card.

FIG. 4 is a diagram of one embodiment of an apparatus for verifying an identity card. In the illustrated example, a dedicated verification apparatus 401 is presented. In this example embodiment, the verification apparatus includes a card receiver/reader component 405, a display component 407, and an image capture component 409. The receiver/reader component 405 receives the identity card 403 and includes a reading device that captures and inputs the private data 411 from the card. The receiver/reader 405 may also retrieve public information from the card for purposes of comparison and authentication. The receiver/reader 405 passes this information to the processing/analysis component of the verification apparatus. The processing/analysis component decodes the data and presents it to the operator. The data can be presented to the user through a display 407 or similar output device. The user may be relied upon to authenticate the received private information by comparison with the card holder.

In another embodiment, the authentication process is automated. The processing/analysis component compares the received private data with public data received from the receiver/reader component 405, an image capture component 409 or similar immediate capture component, database data retrieved from the tracking database based on the private information or using similar data. If a comparison of private and public data does not result in a match, then a failure indicator can be displayed to the user as a message 415 or similar indicator (e.g., a flashing light 417).

Figure 5:
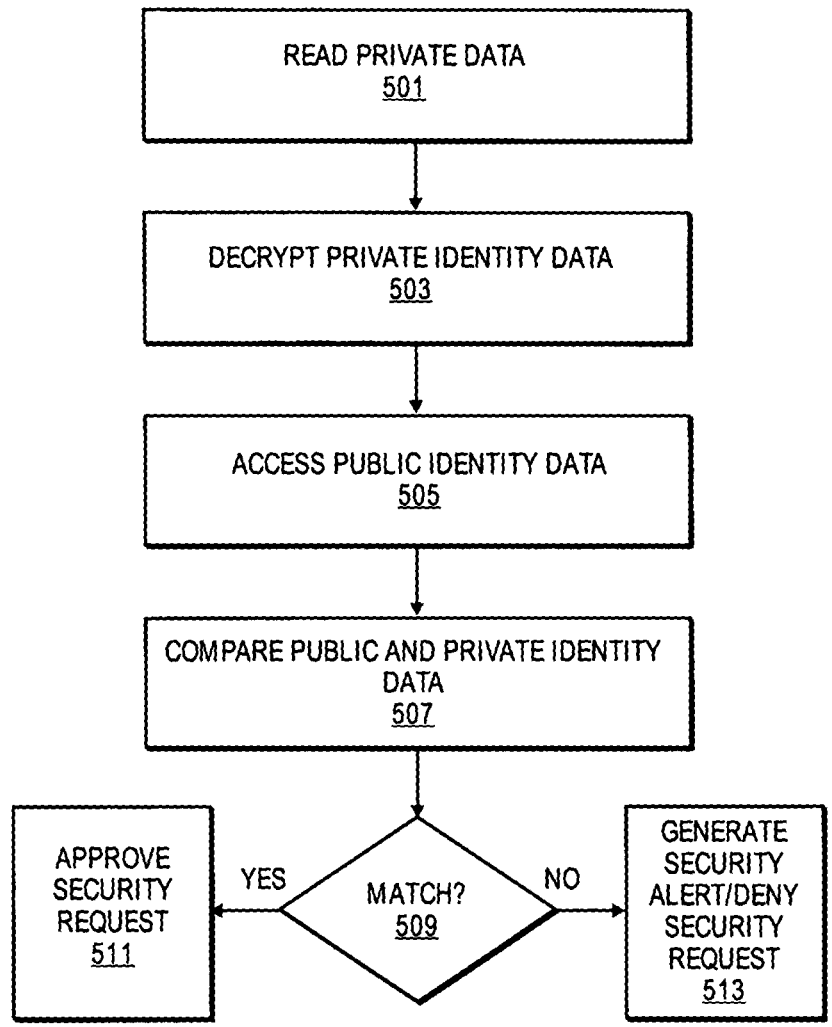
FIG. 5 is a flowchart of one embodiment of a process for approving a security request based on data from a security card.

FIG. 5 is a flowchart of one embodiment of a process for approving a security request based on data from a security card. In one embodiment, access to a resource, location or privilege can be restricted based on a requester establishing a proper security clearance. This process can be initiated by reading an identity card to obtain the private data (block 501). The private data is decoded and may be decrypted as well (block 503). The decoding and decryption algorithms may be fixed or determined based on indicators in the private data.

In one embodiment, public data is retrieved that corresponds to the private data that has been decoded and decrypted (block 505). The public data can be retrieved from the identity card, immediate capture devices, or local or remote databases.

The public and private data is compared (block 507). In one embodiment, the comparison results in a match, score, rating or similar value. A match value can be used for a pass/fail security system. A score, rating or similar scaled value can be used for a security system with varying levels of access. A low score, rating or similar scaled value can restrict access to a resource to minimal access such as a read only access. A high score, rating or similar scaled value can grant greater access to a resource. Determination of a scaled value may be based on direct encoding of the value or indirect encoding of the value. A direct encoding may be an encoding of the value as an integer or similar value that corresponds to a specific security level. An example of an indirect encoding may be an encoding where a number of identity features are retrieved and compared. Each successful comparison increases the scaled value and the level of access granted. For example, a high level officer in a corporation can have an identity card with a large number of identity features encoded therein. A low level employee can have an identity card with a smaller number of identity features encoded therein.

A match is determined based on a pass/fail system or meeting a threshold value for a given security level (block 509). If the requested access results in a match then the access request is automatically or manually approved (block 511). If the requested access does not result in a match then the access request is denied and a security alert or warning may be generated (claim 513).

Figure 6:
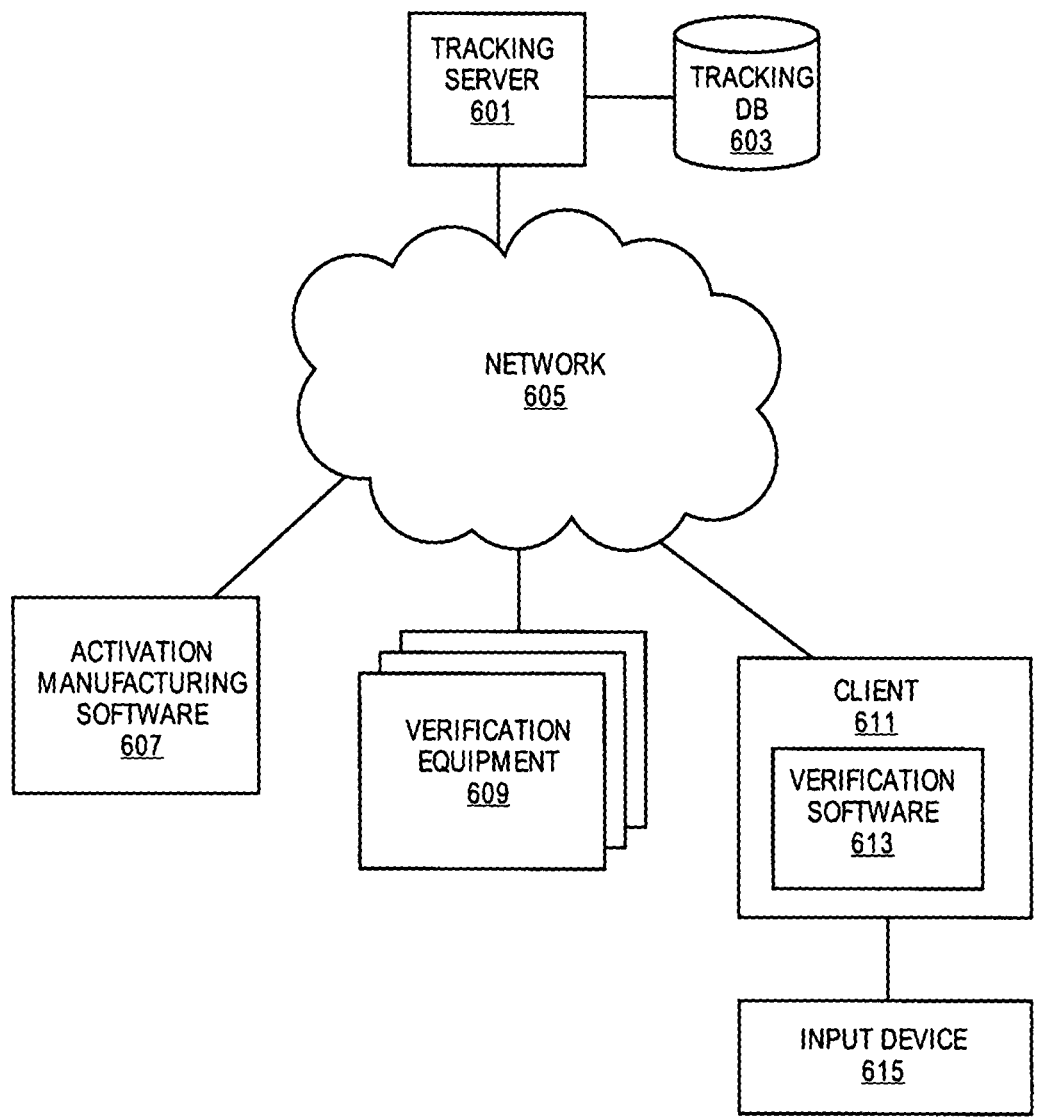
FIG. 6 is a diagram of one embodiment of a verification system.

FIG. 6 is a diagram of one embodiment of a verification system. In one embodiment, a verification system includes a tracking server 601, tracking database 603, network 605, activation/manufacturing software 607, verification equipment 609, client 609 and similar components. The verification system generates, verifies and authenticates identity cards to provide a system for managing access to information, privileges and similar resources. In one embodiment, the components are controlled by a single entity such as a government agency, corporation or similar entity. In another embodiment, the components are controlled by multiple entities. Any combination of entities can control any combination of the components of the system.

A tracking server 601 manages private and public data in the verification system. The tracking server 601 accesses and stores the private and public data in the tracking database 603. The tracking server 601 services requests from verification equipment 609 and clients 611 for public and private data. The verification equipment 609 or client 611 sends decoded private data that is used to perform a search or lookup operation on the tracking database 603. The data retrieved from the tracking database 603 is returned to the verification equipment 609 or client 611. The returned data is used for authentication.

The activation/manufacturing software 607 is responsible for providing new private and public data to be printed onto new identity cards. In one embodiment, this new identity data can be obtained from the tracking server 601 and tracking database 603. In another embodiment, private and public data is input at the activation/manufacturing 607. The activation/manufacturing software 607 can also send data to the tracking server 601 to be stored into the tracking database 603.

Verification equipment 609 is a specialized verification apparatus that reads identity card private and public data. The verification equipment 609 further includes a processing and analysis component, display component, communication component and may optionally include an immediate capture component. The processing and analysis component is a processing device and software that perform decoding and decryption operations. The processing and analysis component may also drive the display, perform security access determination, matching operations and similar authentication operations, and manage network communications and similar activities. The display component provides visual information such as private and public data as well as security approval information to a user. The immediate capture component can be any type of data input device that can be used to obtain current information about an identity card holder. The immediate capture component can be an image capture device, a video capture device, an audio capture device, a signature input device, a fingerprint or iris scanning device or similar input device.

A client 611 is a general purpose verification apparatus. The client 611 can be any type of general computing device including a desktop, laptop, workstation, server, handheld device, console device or similar device. The client 611 executes verification software. The verification software 613 can be any type of application capable of receiving input data from an input device 615. The input device 615 can be a card reader, immediate capture device or similar input device. The verification software 613 can perform the same functions as the verification equipment 609. In addition, the verification software 613 may perform addition functions such as requesting data from the tracking server 601 for generating reports and similar functions.

The network 605 can be any type of network including a local area network (LAN), wide area network (WAN), such as the Internet, or similar network. The connections between the components of the verification system can be established as secure connections for example as private network, virtual private network or similar secured or closed network. The network 605 can connect any number of tracking servers 601, tracking databases 603, activation/manufacturing software 607, verification equipment or clients 611 and similar components.

In one embodiment, components of the verification apparatus may be stored on a machine-accessible storage medium that may be a single medium. The term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instructions for execution by the machine and that cause the machine to perform any one or more of the methodologies of the present invention. The term "machine-accessible storage medium" shall accordingly be taken to include, but not be limited to, solid-state memories and optical and magnetic media.

Thus, a method and apparatus for managing verification and authentication based on an identity card have been described. It is to be understood that the above description is intended to be illustrative and not restrictive. Many other embodiments will be apparent to those of skill in the art upon reading and understanding the above description. The scope of the invention should, therefore, be determined with reference to the appended claims, along with the full scope of equivalents to which such claims are entitled.

The invention claimed is:

1. A method comprising:
    reading a digitally signed identification feature from a surface of an identification card, wherein the identification feature is digitally signed using a card issuer's private key;
    decoding the digitally signed identification feature to obtain an encrypted identification feature;
    detecting, by a processing device, a type of encryption for the identification feature using an indicator in data read from the identification card;
    decrypting the encrypted identification feature and the card issuer's public key to obtain private identity data;
    obtaining, from the surface of the identification card, a plurality of public identification features corresponding to the private identity data;
    comparing the private identity data with the corresponding public identification features to determine a scaled match value in view of a match of the private identity data with a number of the corresponding public identification features, wherein the scaled match value corresponds to the number of public identification features that match the private identity data;
    comparing the scaled match value to a plurality of thresholds, each of the plurality of thresholds corresponding to a different security level; and
    approving a holder of the identification card for security access at a given security level in response to the scaled match value meeting a threshold of the plurality of thresholds corresponding to the given security level.

2. The method of claim 1, further comprising:
    displaying the digitally signed identification feature.

3. The method of claim 1, wherein the digitally signed identification feature is read from a two dimensional bar code.

4. The method of claim 1, wherein the digitally signed identification feature is read from stenographically hidden data.

5. A non-transitory machine readable medium, having instructions stored therein, which when executed, cause a processing device to:
    read a digitally signed identification feature from a surface of an identification card, wherein the identification feature is digitally signed using a card issuer's private key;
    decode the digitally signed identification feature to obtain an encrypted identification feature;
    detect, by the processing device, a type of encryption for the identification feature using an indicator in data read from the identification card;
    decrypt the encrypted identification feature and the card issuer's public key to obtain private identity data;
    obtain, from the surface of the identification card, a plurality of public identification features corresponding to the private identity data;

compare the private identity data with the corresponding public identification features to determine a scaled match value in view of a match of the private identity data with the corresponding public identification features, wherein the scaled match value corresponds to the number of public identification features that match the private identity data;

compare the scaled match value to a plurality of thresholds, each of the plurality of thresholds corresponding to a different security level; and approve a holder of the identification card for security access at a given security level in response to the scaled match value meeting a threshold of the plurality of thresholds corresponding to the given security level.

6. The non-transitory machine readable medium of claim 5, wherein the instructions further cause the processing device to:

display the digitally signed identification feature.

7. The non-transitory machine readable medium of claim 5, wherein the digitally signed identification feature is read from a two dimensional bar code.

8. The non-transitory machine readable medium of claim 5, wherein the digitally signed identification feature is read from stenographically hidden data.

* * * * *